(12) United States Patent
Yoshida

(10) Patent No.: US 8,632,283 B2
(45) Date of Patent: Jan. 21, 2014

(54) MACHINE TOOL

(75) Inventor: Makoto Yoshida, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 791 days.

(21) Appl. No.: 12/846,095

(22) Filed: Jul. 29, 2010

(65) Prior Publication Data

US 2011/0056343 A1  Mar. 10, 2011

(30) Foreign Application Priority Data

Sep. 8, 2009  (JP) .................. 2009-207450

(51) Int. Cl.
*E02D 5/44* (2006.01)

(52) U.S. Cl.
USPC ............. 408/238; 408/35; 408/234; 409/231; 409/232; 409/235; 483/30

(58) Field of Classification Search
USPC ....... 29/26 A, 26 R, 26 B, 27 R, 561; 408/35, 408/234, 238; 409/235, 231, 232; 483/30, 483/54, 55, 56
See application file for complete search history.

(56) References Cited

U.S. PATENT DOCUMENTS

| 4,621,407 A | * | 11/1986 | Suzuki ........................... 483/56 |
| 2004/0045146 A1 | | 3/2004 | Studemann et al. |

FOREIGN PATENT DOCUMENTS

JP  07-088737 A1  4/1995

OTHER PUBLICATIONS

Japanese Office Action, Japanese Application No. 2009-207450, dated Jun. 18, 2013 (2 pages).

\* cited by examiner

*Primary Examiner* — Richard Chang
(74) *Attorney, Agent, or Firm* — Burr & Brown, PLLC

(57) ABSTRACT

In a machine tool, a support member to which a headstock is mounted movably in an upward-downward direction is movable so as to change a position thereof in a horizontal direction relative to that of a bed. A guide member is provided on the bed and configured to guide the support member. An engageable portion at which the support member is supported by the guide member is located in the support member at a level within a range of upward-downward movement of the headstock along the support member.

1 Claim, 2 Drawing Sheets

MACHINE TOOL

CROSS-REFERENCE TO RELATED APPLICATIONS

This application claims the entire benefit of Japanese Patent Application Number 2009-207450 filed on Sep. 8, 2009, the entirety of which is incorporated by reference.

BACKGROUND OF THE INVENTION

1. Field of the Invention

This invention relates to a machine tool comprising a column which is slidable in a predetermined direction.

2. Description of Related Art

A machine tool including a column slidable in a z-axis direction (i.e., frontward and rearward) on a bed and a headstock translatable in a y-axis direction (i.e., upward and downward) along the column is known in the art (e.g., JP 7-88737 A). Such a machine tool 51 is now described briefly with reference to FIG. 2. In FIG. 2, X axis, Y axis and Z axis are axes perpendicular to one another, and are oriented such that the X axis extends leftward and rightward, the Y axis extends upward and downward, and the Z axis extends frontward and backward; thus, the terms "x-axis direction", "y-axis direction" and "z-axis direction" are used to designate a leftward-rightward direction, an upward-downward direction and a frontward-backward direction, respectively.

The machine tool 51 includes a bed 52, a pair of rail members 53 extending in the z-axis direction on top of the bed 52, a column 54 attached, movably in the z-axis direction, to the rail members 53, and a headstock 56 including a spindle 57. The headstock 56 is provided at a front side of the column 54 and configured to be translatable in the y-axis direction (i.e., slidable along the front side of the column 54).

When this machine tool 51 is operated for machining, the headstock 56 is moved in the y-axis direction. However, the headstock 56 moved upward brings the center of gravity of the column 54 upward accordingly; therefore, the structural strength and stability of the column 54 would disadvantageously be lowered. This problem may possibly be overcome by providing the column 54 with increased rigidity, but this would create several other problems such as an undesirable increase in the mass of the column 54, upsizing of the machine tool 51 in its entirety, and upsizing of a motor or the like for driving the column 54.

It would thus be desirable to provide a machine tool in which a support member with a headstock mounted thereto is kept strong and stable enough to withstand the upward and downward movement of the headstock without upsizing of the support member or the like. The present invention has been made in view of the aforementioned problems, and illustrative, non-limiting embodiments of the present invention may overcome the above disadvantages and other disadvantages not described above.

SUMMARY OF THE INVENTION

In one aspect, a machine tool comprises a bed, a headstock, a support member and a guide member. The headstock includes a spindle, and is mounted to the support member, movably in an upward-downward direction. The support member is movable so as to change a position thereof in a horizontal planes relative to the bed. The guide member is provided on the bed and configured to guide the support member. The support member includes an engageable portion at which the support member is supported by the guide member. The engageable portion is located in the support member at a level within a range of upward-downward movement of the headstock along the support member.

The aforementioned bed may include a pair of wall portions standing upright with a predetermined distance put therebetween. In this configuration, the guide member may be disposed on upper ends of the wall portions, such that a lower portion of the support member supported by the guide member is disposed between the wall portions.

According to the above aspect of the present invention, the engageable portion for allowing the support member to be supported by the guide member is located at a level within a range of the upward-downward movement of the headstock along the support member; thus, the support member is supported by the guide member at the level which is higher than that at which a conventional support member (column) is supported by a guide member (a pair of rail members). Therefore, the vertical distance from a position in the support member at which the support member is supported by the guide member to a position of the headstock that has been moved upwardly along the support member in this configuration is shorter than in the conventional configuration. Consequently, undesirable deterioration in the structural strength and stability of the support member due to the upward shift of the center of gravity can be suppressed without any additional measures such as increasing the mass of the support member. Moreover, the mass of the support member can be reduced as compared with the conventional configuration, so that the miniaturization of the machine tool can be achieved. Further, the feed speed, acceleration, deceleration, etc. of the support member can be increased, so that the machining operation can be performed with improved efficiency.

With the additional feature of the wall portions in the bed as described above, which wall portions are configured to stand upright with a predetermined distance put therebetween, the thickness of the bed in the vertical direction is increased, so that the flexural rigidity of the bed can be increased.

BRIEF DESCRIPTION OF THE DRAWINGS

The above aspect, other advantages and further features of the present invention will become more apparent by describing in detail illustrative, non-limiting embodiments thereof with reference to the accompanying drawings, in which.

DETAILED DESCRIPTION OF THE INVENTION

Figure 1:
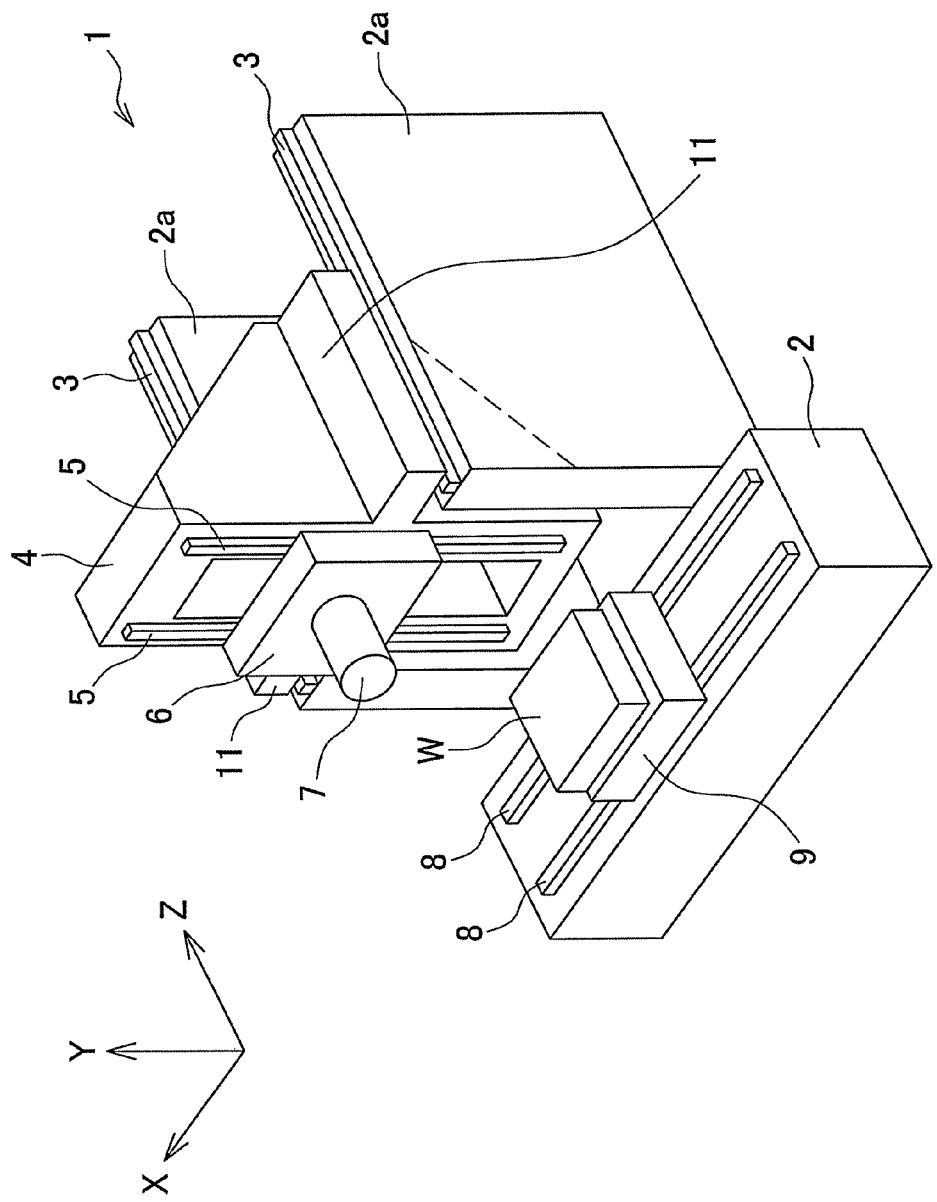
FIG. 1 is a schematic view showing a machine tool according to an exemplary embodiment of the present invention.
Figure 2:
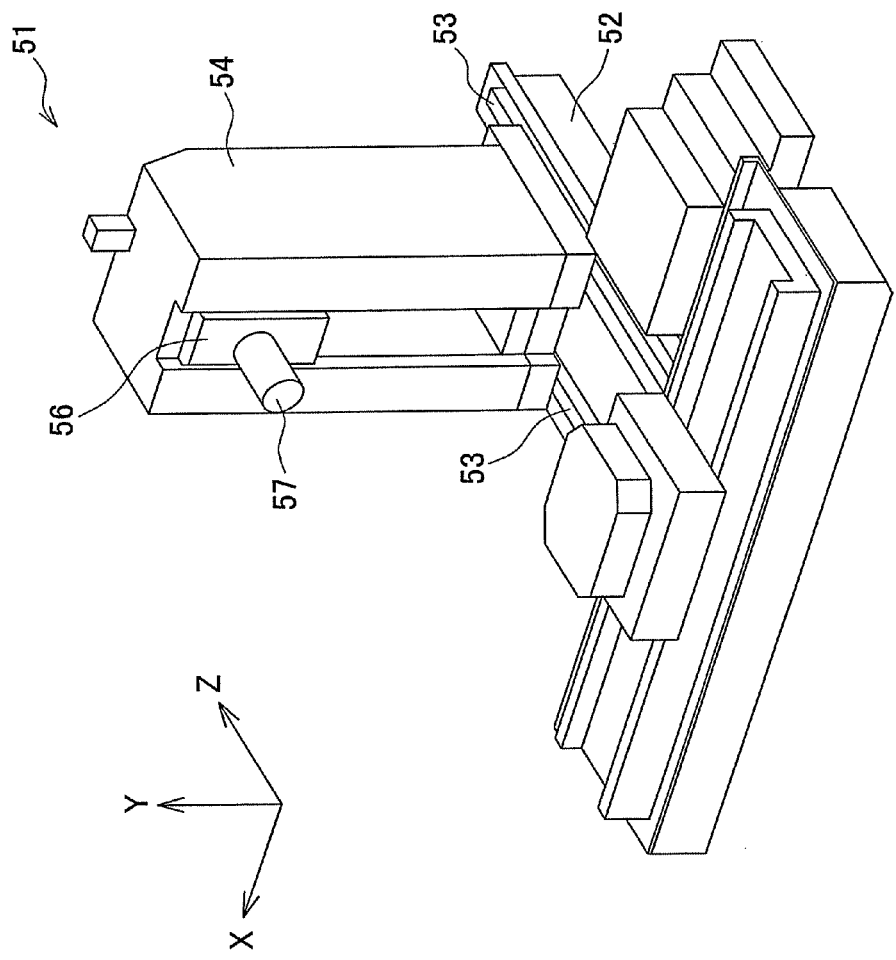
FIG. 2 is a schematic view showing a conventional machine tool.

A detailed description of a machine tool will be given according to an exemplary embodiment of the present invention with reference made to FIG. 1. In this embodiment as well, X axis, Y axis and Z axis are axes perpendicular to one another, and are oriented such that the X axis extends leftward and rightward, the Y axis extends upward and downward, and the Z axis extends frontward and backward; thus, the terms "x-axis direction", "y-axis direction" and "z-axis direction" are used to designate a leftward-rightward direction, an upward-downward direction and a frontward-backward direction, respectively.

A machine tool 1 is a device designed specifically for machining of a workpiece W placed on a table 9 by means of a tool installed at a spindle 7. In a bed 2 as a pedestal, a pair of wall portions 2a extending in the z-axis direction are disposed parallel to each other and stand upright with a predetermined distance put therebetween in the x-axis direction. On an upper end face of each wall portion 2a, a z-axis rail 3 is provided which extends in the z-axis direction.

Denoted by 4 is a column. At a front side of the column 4, y-axis rails 5 are provided. The y-axis rails 5 extend in the y-axis direction from a point just short of an upper end of the column 4 to a point just short of a lower end of the column 4. At left and right sides of the column 4, flange portions 11 are provided. The flange portions 11 protrude from around vertically middle positions outward to the left and to the right. The column 4 bridges the wall portions 2a with its flange portions 11 provided to the z-axis rails 3, respectively. A lower half (lower portion) of the column 4 is disposed between the wall portions 2a.

At the front side of the column 4, a headstock 6 including a spindle 7 is attached to the y-axis rails 5 in such a manner that the headstock 6 is movable upward and downward along the y-axis rails 5. In this way, the headstock 6 is configured to be movable downward beyond the position at which the flange portions 11 are provided. Meanwhile, x-axis rails 8 are provided on the bed 2 disposed in front of the headstock 6. The x-axis rails 8 extend in the x-axis direction. A table 9 is attached to the x-axis rails 8 in such a manner that the table 9 is movable in the x-axis direction. Various operations of the column 4, headstock 6, spindle 7 and table 9 are controlled by a numerical control system (not shown).

In the machine tool 1 configured as described above, the column 4 with the headstock 6 attached to its front side in such a manner that the headstock 6 is movable substantially in the range from the upper end to the lower end of the column 4 is provided with flange portions 11 protruding substantially from the vertically middle positions of its left and right sides, and the flange portions 11 are attached to the z-axis rails 3 provided on the upper end faces of the wall portions 2a. Accordingly, when the column 4 is installed and supported on the z-axis rails 3, the lower half of the column 4 is disposed between the wall portions 2a, and only the upper half of the column 4 protrudes upward beyond the position at which the column 4 is supported by the z-axis rails 3. Since the machine tool 1 according to this embodiment is configured to support the column 4 at a level higher than that at which the column is supported in the conventional machine tool, the vertical distance from the position at which the column 4 is supported to the position of the headstock 6 located when it has been moved to the position close to the upper end of the column 4 is shorter as compared with the conventional configuration. Therefore, undesirable deterioration in the structural strength and stability of the column 4 due to the upward shift of the center of gravity can be suppressed without any additional measures such as increasing the mass of the column 4. Furthermore, the mass of the column 4 can be reduced as compared with the conventional configuration, so that the miniaturization of the machine tool 1 can be achieved. Furthermore, the feed speed, acceleration, deceleration, etc. of the column 4 can be increased, so that the machining operation can be performed with improved efficiency.

Since the bed 2 includes the wall portions 2a which are configured to stand upright, the thickness of the bed 2 in the y-axis direction is increased, so that the flexural rigidity of the bed 2 itself can be increased.

The machine tool consistent with the present invention is not limited to the above-described embodiment. It is to be appreciated that the shape and/or arrangement of the bed and/or the column may be modified where appropriate without departing the scope of the present invention.

For example, in the above-described embodiment, the wall portions 2a standing upright is provided in the bed 2 and the z-axis rails 3 are provided on the upper end faces of the wall portions 2a. Instead of the wall portions 2a, however, an assembly of frame-like members may be provided so that the z-axis rails may be disposed at a level with a predetermined distance higher than the upper surface of the bed 2.

Moreover, the headstock 6 illustrated as being movable vertically in FIG. 1, the specific embodiment may be replaced with a headstock configured to be movable obliquely upward and downward, as long as it changes a position thereof in the upward-downward direction. For example, the front side of the column 4 may be designed to be a slope along which the headstock 6 is movable. Furthermore, the column 4 may not necessarily be horizontally movable, but may be designed to change a position thereof in horizontal planes. For example, the column 4 may be replaced with one which is configured to be movable obliquely (e.g., with the z-axis direction set to intersect the horizontal plane).

In addition, an engageable portion (each flange portion 11) at which the column 4 is supported is provided at a vertically substantial middle position of the column 4 in the above-described embodiment; however, the position at which the engageable portion is provided may be changed or modified where appropriate. The engageable portion may preferably be located in the column 4 at a level within a range of upward-downward movement of the headstock 6, and this will suffice. The engageable portion may be provided as an integral part of the column 4, or an independent member may be fixed to the side surfaces or the like of the column 4 so that the engageable portion may be provided.

The invention claimed is:
1. A machine tool comprising:
a headstock including a spindle;
a bed including a pair of wall portions disposed in a direction parallel to an axis of the spindle, and the pair of wall portions standing upright with a predetermined distance therebetween;
a support member to which the headstock is mounted movably in an upward-downward direction with a guide rail vertically provided on the support member from an upper end to a lower end of the support member, the support member being movable so as to change a position thereof in a direction parallel to the spindle axis in horizontal planes relative to the bed; and
a guide member provided on upper ends of the wall portions and configured to guide the support member,
wherein the support member includes an engageable portion at which the support member is supported by the guide member, the engageable portion being provided on a side surface of the support member at a vertically middle position thereof and a lower portion of the support member supported by the guide member being disposed between the wall portions, and
wherein the headstock is movable upward and downward beyond the position at which the engageable portion is provided.

* * * * *